US011505696B2

(12) United States Patent
Grcev et al.

(10) Patent No.: US 11,505,696 B2
(45) Date of Patent: Nov. 22, 2022

(54) NON-BROMINE, NON-CHLORINE FLAME RETARDANT, GLASS FILLED POLYCARBONATE WITH IMPROVED MULTI-AXIAL IMPACT STRENGTH

(71) Applicant: SABIC GLOBAL TECHNOLOGIES B.V., Bergen op Zoom (NL)

(72) Inventors: Snezana Grcev, Bergen op Zoom (NL); Joshua Arie Van Den Bogerd, Tholen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 335 days.

(21) Appl. No.: 16/608,267

(22) PCT Filed: Apr. 25, 2018

(86) PCT No.: PCT/IB2018/052875
§ 371 (c)(1),
(2) Date: Oct. 25, 2019

(87) PCT Pub. No.: WO2018/198046
PCT Pub. Date: Nov. 1, 2018

(65) Prior Publication Data
US 2020/0181399 A1    Jun. 11, 2020

Related U.S. Application Data

(60) Provisional application No. 62/489,503, filed on Apr. 25, 2017.

(51) Int. Cl.
| | |
|---|---|
| C08G 64/04 | (2006.01) |
| C08K 5/00 | (2006.01) |
| C08K 5/42 | (2006.01) |
| C08K 9/08 | (2006.01) |
| C08L 25/12 | (2006.01) |
| C08L 69/00 | (2006.01) |
| C08K 5/524 | (2006.01) |
| C08K 5/5393 | (2006.01) |
| C08K 7/14 | (2006.01) |
| C08L 27/18 | (2006.01) |

(52) U.S. Cl.
CPC .............. *C08L 69/00* (2013.01); *C08G 64/04* (2013.01); *C08K 5/0066* (2013.01); *C08K 5/42* (2013.01); *C08K 5/524* (2013.01); *C08K 5/5393* (2013.01); *C08K 7/14* (2013.01); *C08K 9/08* (2013.01); *C08L 25/12* (2013.01); *C08L 27/18* (2013.01); *C08K 2201/003* (2013.01); *C08K 2201/004* (2013.01)

(58) Field of Classification Search
CPC .......... C08L 69/00; C08L 25/12; C08K 7/14; C08K 5/00; C08K 5/42; C08K 9/08; C08G 64/04
USPC ........................................................ 524/494
See application file for complete search history.

(56) References Cited

U.S. PATENT DOCUMENTS

| | | | |
|---|---|---|---|
| 6,308,142 B1 | 10/2001 | Choate et al. | |
| 7,786,246 B2 | 8/2010 | Jansen et al. | |
| 8,071,694 B2 | 12/2011 | Yu et al. | |
| 2004/0116588 A1 | 6/2004 | Lin et al. | |
| 2004/0180996 A1* | 9/2004 | Pearson | C08K 5/5205 |
| | | | 524/99 |
| 2005/0009968 A1* | 1/2005 | Singh | C08L 69/00 |
| | | | 524/155 |
| 2007/0191518 A1* | 8/2007 | Chen | C08L 69/00 |
| | | | 524/155 |
| 2009/0111943 A1 | 4/2009 | Bhat et al. | |
| 2012/0245262 A1 | 9/2012 | Hao et al. | |
| 2013/0131241 A1 | 5/2013 | van de Grampel et al. | |
| 2013/0317141 A1* | 11/2013 | Cheng | C08K 7/14 |
| | | | 524/116 |
| 2014/0058024 A1 | 2/2014 | Son et al. | |
| 2014/0200303 A1 | 7/2014 | Steendam et al. | |
| 2014/0329948 A1 | 11/2014 | Erkelenz et al. | |

FOREIGN PATENT DOCUMENTS

| | | |
|---|---|---|
| CN | 1735653 A | 2/2006 |
| CN | 101384684 A | 3/2009 |
| CN | 101910271 A | 12/2010 |
| CN | 103289344 A | 9/2013 |
| CN | 103946308 A | 7/2014 |
| CN | 103958585 A | 7/2014 |
| CN | 104350098 A | 2/2015 |
| CN | 104918999 A | 9/2015 |
| CN | 107254155 A | 10/2017 |
| JP | H08-027368 A | 1/1996 |
| JP | 2011-116927 A | 6/2011 |

(Continued)

OTHER PUBLICATIONS

International Patent Application No. PCT/IB2018/052875; Int'l Search Report and the Written Opinion; dated Jul. 16, 2018; 13 pages.
International Patent Application No. PCT/IB2018/052875; Int'l Preliminary Report on Patentability; dated Nov. 7, 2019; 9 pages.
International Patent Application No. PCT/IB2018/052874; Int'l Written Opinion and Search Report; dated Jul. 16, 2018; 9 pages.
International Patent Application No. PCT/IB2018/052874; Int'l Preliminary Report on Patentability; dated Nov. 7, 2019; 8 pages.
Xu et al.; "Composite Material Molding Process and Application"; National Defense Industry Press; Mar. 2017; 8 pages (contains English Translation).

*Primary Examiner* — Deve V Hall
(74) *Attorney, Agent, or Firm* — Cantor Colburn LLP

(57) ABSTRACT

In various aspects, the disclosure relates to polycarbonate compositions exhibiting improved impact strength, both multi axial and notched Izod, as well as thin-walled flame resistance while free or substantially free of bromine or chlorine flame retardant additives. The polycarbonate compositions may comprise non-bonding glass fiber, butyl tosylate, and/or a phosphorous based stabilizer.

17 Claims, 5 Drawing Sheets

(56) References Cited

FOREIGN PATENT DOCUMENTS

| WO | WO 2005/005542 A1 | 1/2005 |
| WO | WO 2013/076636 A1 | 5/2013 |
| WO | WO 2014/108867 A1 | 7/2014 |
| WO | WO 2017/103764 A1 | 6/2017 |

* cited by examiner

Table 1: Components of the thermoplastic compositions.

| Name/Source | Description | Supplier |
|---|---|---|
| LEXAN™ 105 | Polycarbonate derived from bisphenol A (30,000 Mw); Linear Bisphenol A Polycarbonate homopolymer, produced via interfacial polymerization, Mw of about 30,000 g/mol as determined by GPC using polycarbonate standards, para- cumylphenol (PCP) end-capped | SABIC-IP |
| LEXAN™ 175 | Polycarbonate derived from bisphenol A (21,800 Mw); Linear Bisphenol A Polycarbonate homopolymer, produced via interfacial polymerization, Mw of about 21,800 g/mol as determined by GPC using polycarbonate standards, para- cumylphenol (PCP) end-capped | SABIC-IP |
| Non-bonding GF (CS108F-14P) | Non-bonding glass fiber; silicon dioxide ($SiO_2$); boron free E-glass/E-CR | 3B |
| Bonding GF (CS 122Y-14P) | Bonding glass fiber; silicon dioxide ($SiO_2$); boron free E-CR type | 3B |
| Hydrolysis GF (DS 1103-10N) | Hydrolysis glass fiber; | 3B Fibreglass SPRL |
| Asahi GF (CS 03 MAFT142A) | Asahi FT142A glass fiber; $SiO_2$, E-glass | OC |
| Standard GF1 (T-120) | Standard glass fiber for crystalline polymer matrix; $SiO_2$, E-glass | Nippon Electric Glass |
| Standard GF2 (CPIC ECS 303H-3) | Standard glass fiber for PBT; boron free E-glass | Nippon Electric Glass |
| Chopped GF (CS DS 2200-13P) | Chopped glass fiber; E-CR glass | |
| Rimar salt FR (Bayowet™ C4) | Potassium perfluorobutanesulfonate (Rimar); flame retardant additive | Laxess |
| TSAN | Styrene acrylonitrile encapsulated polytetrafluoroethylene (PTFE); 50% PTFE, 50% SAN | SABIC-IP |
| $H_3PO_{3(acid)}$ | $H_3PO_3$ solution (45% in water); phosphorous acid | Quaron |
| PETS | Pentaerythritol tetrastearate (PETS); greater than 90% esterified | Faci |
| Irgafos™ 168 | Tris(2,4-di-tert-butylphenyl) phosphite; antioxidant | Ciba |
| Cyasorb™ UV5411 | 2-(2 hydroxy-5-t-octylphenyl) benzotriazole; UV absorber | Cytec industries |
| Phosphonite PEPQ | tetrakis(2,4-di-tert-butylphenyl)-4,4-diphenyldiphosphonite) | Ciba |
| Doverphos™ S-9228 | bis(2,4-dicumyl)pentaerythritol diphosphate | ICC |
| BuTos (Masterbatch) | n-butyl p-toluenesulfonate (butyl tosylate) in PC157 master batch; 0.3 wt. % of BuTos in LEXAN*175 powder using 14 wt.% of PETS | PolyAdd |

FIG. 1

Table 2. Characteristics of glass fibers.

| Description | Diameter (μm) | Length (mm) | Polymer matrix designation |
|---|---|---|---|
| Non-bonding GF | 13.7 | 4 | polycarbonate |
| Bonding GF | 13.7 | 4 | polycarbonate |
| Hydrolysis GF | 10 | 4 | polyamide/polyphenylene oxide blends |
| Asahi FT142A GF | 13 | 4.5 | polystyrene |
| Standard GF | 12.5/13 | 2 – 4 | polybutylene terephthalate (PBT) |
| Standard GF2 | 10 | 4.5 | PBT |
| Chopped GF CS DS 2200-13P 4MM | 13 | 4 | polyolefins |

FIG. 2

Table 5. Thermoplastic composition with glass fiber filler.

| Description | | | Unt. | CE1 | Ex2 | CE3 | CE4 | CE5 | CE6 | CE7 |
|---|---|---|---|---|---|---|---|---|---|---|
| PC 175 | | | % | 11.74 | 11.74 | 11.74 | 11.74 | 11.74 | 11.74 | 11.74 |
| PC 105 | | | % | 78.28 | 78.28 | 78.28 | 78.28 | 78.28 | 78.28 | 78.28 |
| Irg168 | | | % | 0.05 | 0.05 | 0.05 | 0.05 | 0.05 | 0.05 | 0.05 |
| UVA 5411 | | | % | 0.15 | 0.15 | 0.15 | 0.15 | 0.15 | 0.15 | 0.15 |
| PETS | | | % | 0.27 | 0.27 | 0.27 | 0.27 | 0.27 | 0.27 | 0.27 |
| RIMAR Salt | | | % | 0.06 | 0.06 | 0.06 | 0.06 | 0.06 | 0.06 | 0.06 |
| TSAN | | | % | 0.15 | 0.15 | 0.15 | 0.15 | 0.15 | 0.15 | 0.15 |
| Bonding GF | | | % | 9.3 | 0 | 0 | 0 | 0 | 0 | 0 |
| Non-bonding GF | | | % | 0 | 9.3 | 0 | 0 | 0 | 0 | 0 |
| Hydrolysis GF | | | % | 0 | 0 | 9.3 | 0 | 0 | 0 | 0 |
| Asahi GF | | | % | 0 | 0 | 0 | 9.3 | 0 | 0 | 0 |
| Standard GF1 | | | % | 0 | 0 | 0 | 0 | 9.3 | 0 | 0 |
| Standard GF2 | | | | 0 | 0 | 0 | 0 | 0 | 9.3 | 0 |
| Chopped GF | | | | 0 | 0 | 0 | 0 | 0 | 0 | 9.3 |
| | | | | | | | | | | |
| MAI | Energy at max force | 23°C | J | 10 | 52 | 14 | 14 | 12 | 12 | 46 |
| | Energy at max force | 0°C | J | 7 | 45 | 12 | 8 | 8 | 8 | 43 |
| | Energy at max force | -30°C | J | 5 | 32 | 10 | 6 | 7 | 8 | 32 |
| 3mm NI (ISO) | Impact | 23°C | kJ/m² | 8.0 | 8.2 | 7.6 | 7.2 | 9.2 | 9.4 | 9.9 |
| | Impact | 0°C | kJ/m² | 7.4 | 7.8 | 7.0 | 7.1 | 8.7 | 8.4 | 8.7 |
| | Impact | -30°C | kJ/m² | 6.7 | 7.1 | 6.8 | 6.2 | 8.1 | 8.1 | 7.5 |
| 0.8mm | FOT | 23°C ; 48h | s | 70.1 | 117.0 | 103.0 | 93.6 | 68.6 | 85.7 | 57 |
| | Burning drips | 23°C ; 48h | | 70% | 60% | 50% | 40% | 40% | 60% | 0% |
| | V rating | 23°C ; 48h | - | V2 | V2 | V2 | V2 | V2 | V2 | V2 |
| 1.5mm | FOT | 23°C ; 48h | s | 33.8 | 30.0 | 32.7 | 32.0 | 32.2 | 31.7 | 33.1 |
| | Burning drips | 23°C ; 48h | - | 0% | 0% | 0% | 0% | 0% | 0% | 0% |
| | V rating | 23°C ; 48h | - | V0 | V0 | V0 | V0 | V0 | V0 | V0 |

FIG. 3

Table 6A. Polycarbonate and non-bonding glass fiber formulations with varying stabilizers.

| Description | Unit | CE 1 | Ex 2 | Ex 8 | CE 9 | Ex 10 | CE 11 | CE 12 | Ex 13 | CE 14 | Ex 15 | CE 16 |
|---|---|---|---|---|---|---|---|---|---|---|---|---|
| PC 175 | % | 11.74 | 11.74 | 11.74 | 11.74 | 11.74 | 11.74 | 11.74 | 11.74 | 11.74 | 11.74 | 11.74 |
| Irg168 | % | 0.05 | 0.05 | 0.05 | 0.05 | 0.05 | 0.05 | 0.05 | | | | |
| UVA 5411 | % | 0.15 | 0.15 | 0.15 | 0.15 | 0.15 | 0.15 | 0.15 | 0.15 | 0.15 | 0.15 | 0.15 |
| Phosphonite PEPQ | % | | | | | | | | 0.05 | 0.05 | | |
| Doverphos S-9228 | % | | | | | | | | | | 0.05 | 0.05 |
| PETS | % | 0.27 | 0.27 | 0.27 | 0.27 | 0.27 | 0.27 | 0.27 | 0.27 | 0.27 | 0.27 | 0.27 |
| RIMAR Salt | % | 0.2 | 0.2 | 0.2 | 0.2 | 0.2 | 0.2 | 0.2 | 0.2 | 0.2 | 0.2 | 0.2 |
| TSAN | % | 0.5 | 0.5 | 0.5 | 0.5 | 0.5 | 0.5 | 0.5 | 0.5 | 0.5 | 0.5 | 0.5 |
| $H_3PO_{3(acid)}$ | % | | | | | | 0.15 | 0.3 | | | | |
| BuTos | % | | | | 0.0039 | 0.00075 | | | | | | |
| PC 105 | % | 77.79 | 77.79 | 76.79 | 76.79 | 75.29 | 77.64 | 77.49 | 77.79 | 77.79 | 77.79 | 77.79 |
| Non-bonding GF | % | | 9.3 | 9.3 | | 9.3 | 9.3 | 9.3 | 9.3 | | 9.3 | |
| Bonding GF | % | 9.3 | | | 9.3 | | | | | 9.3 | | 9.3 |

FIG. 4

Table 6B. Performance of polycarbonate and non-bonding glass fiber formulations with varying stabilizers.

| Description | | Unit | CE 1 | Ex 2 | Ex 8 | CE 9 | Ex 10 | CE 11 | CE 12 | Ex 13 | CE 14 | Ex 15 | CE 16 |
|---|---|---|---|---|---|---|---|---|---|---|---|---|---|
| MAI | Energy at max force, 23 °C | J | 9 | 48 | 65 | 9 | 69 | 59 | 11 | 62 | 13 | 64 | 11 |
| | Energy at max force, 0°C | J | 6 | 42 | 54 | 9 | 56 | 37 | 6 | 48 | 9 | 49 | 6 |
| | Energy at max force, 30 °C | J | 6 | 33 | 33 | 6 | 37 | 18 | 4 | 38 | 8 | 40 | 5 |
| 3 mm NI (ISO) | Impact, 23°C | kJ/m² | 8.0 | 8.2 | 10.6 | 7.0 | 10.2 | 6.8 | 5.3 | 8.4 | 11.0 | 8.3 | 11.1 |
| | Impact, 0°C | kJ/m² | 7.3 | 7.9 | 8.5 | 7.0 | 8.9 | 6.7 | 5.6 | 7.1 | 8.4 | 7.0 | 8.9 |
| | Impact, 30°C | kJ/m² | 7.0 | 7.1 | 8.2 | 7.0 | 8.0 | 6.1 | 5.1 | 6.4 | 7.6 | 6.5 | 6.6 |
| 0.8 mm | FOT, 23°C 48h | s | 69.3 | 59.9 | 59.6 | 88.9 | 59.4 | 140.0 | 115.0 | 72.3 | 81.1 | 59.9 | 63.3 |
| | Burning drips, 23°C 48h | - | 10% | 0% | 0% | 20% | 0% | 60% | 100% | 20% | 10% | 20% | 0% |
| | V rating, 23°C 48h | - | V2 | V1 | V1 | V2 | V1 | NR | NR | V2 | V2 | V2 | V1 |
| 1.5 mm | FOT, 23°C 48h | s | 27.6 | 35.5 | 39.9 | 33.0 | 46.1 | 88.9 | 140.0 | 36.2 | 41.6 | 34.5 | 43.6 |
| | Burning drips, 23°C 48h | - | 0% | 0% | 0% | 0% | 0% | 10% | 40% | 0% | 0% | 0% | 0% |
| | V rating, 23°C 48h | - | V0 | V0 | V0 | V0 | V0 | V2 | NR | V0 | V0 | V0 | V0 |

FIG. 5

NON-BROMINE, NON-CHLORINE FLAME RETARDANT, GLASS FILLED POLYCARBONATE WITH IMPROVED MULTI-AXIAL IMPACT STRENGTH

CROSS-REFERENCE TO RELATED APPLICATION

This application is the National Stage of International Application No. PCT/IB2018/052875 filed Apr. 25, 2018, which claims the benefit of U.S. Provisional Application No. 62/489,503 filed Apr. 25, 2017, the disclosures of which are incorporated herein by this reference in their entireties.

TECHNICAL FIELD

The disclosure concerns glass filled polycarbonate compositions having non-brominated and/or chlorinated flame retardant additives and exhibiting improved impact strength.

BACKGROUND

Polycarbonate polymers are useful in a number of material applications have an array of advantageous physical properties and mechanical properties including, for example, high impact strength, excellent dimensional stability, glass-like transparency, excellent thermal resistance, and low-temperature toughness. These properties, among others, make polycarbonates desirable for a similarly wide variety of applications including, for example, construction, automotive and transportation, electrical and electronics, telecommunication, packaging, medical, optical/opthalmic, and optical media. Polycarbonate materials are often processed with other materials to improve their physical performance. For example, polycarbonates may be combined with other polymers that function as impact modifiers to produce a more resilient material. In further examples, fillers and others reinforcing additives are introduced to a polycarbonate polymer matrix to enhance properties such as modulus and impact strength. In various applications, flame-retardancy is an important property, for example, in electrical and electronics applications, such as appliance and equipment housings and parts. Ideally, these flame retardant polycarbonate materials exhibit both robust flame retardance and thin walled resilience. Industry standards increasingly require that the flame retardant is free of halogen, particularly bromine. There remains a need in the art for polycarbonate compositions that exhibit good processability and thin wall flame retardancy, while also maintaining impact strength.

SUMMARY

In an aspect, the present disclosure, provides filled compositions comprising: from about 70 weight percent (wt. %) to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 wt. % to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules (J) when tested in accordance with ISO6603 standard and wherein a molded sample of the composition achieves a V1 rating at a thickness of about 0.8 millimeter (mm) and a flame out time of less than about 60 seconds when tested in accordance with UL 94.

In another aspect, the present disclosure relates to A composition comprising: from about 70 wt. % to about 98 wt. % of a polycarbonate polymer component; from about 0.01 wt. % to about 1 wt. % of a flame retardant additive, wherein the flame retardant additive is free or substantially free of bromine and/or chlorine; from about 2 wt. % to about 20 wt. % of a non-bonding glass fiber; and from about 0.01 wt. % to about 5 wt. % of a stabilizer component wherein the stabilizer component comprises one or more of bis (2,4-dicumylphenyl) pentaerythritol diphosphite or tetrakis(2,4-di-tert-butylphenyl)-4,4-biphenyldiphosphonite (PEPQ), wherein a molded sample formed from the composition exhibits a MAI rating energy at max force of greater than about 60 Joules at 23 degrees Celsius (° C.) when tested in accordance with ISO6603 standard and wherein a molded sample of the composition achieves a V2 rating at a thickness of about 0.8 millimeter (mm) UL 94.

Furthermore, this disclosure relates to a method comprising: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; and from about 0.001 to about 5 wt. % of a stabilizer additive component, wherein the stabilizer additive component comprises butyl tosylate, wherein the butyl tosylate and non-bonding glass fiber are present in a ratio of from about from about 1:1000 to about 1:3000 of butyl tosylate to non-bonding glass fiber.

In another aspect, the disclosure concerns an article prepared according to the methods of forming a composition as disclosed herein or an article formed from the compositions disclosed herein.

BRIEF DESCRIPTION OF THE FIGURES

The above-mentioned and other features and advantages of this disclosure, and the manner of attaining them, will become apparent and be better understood by reference to the following description of one aspect of the disclosure in conjunction with the accompanying drawings, wherein:

FIG. 1 presents Table 1 showing the components of the thermoplastic composition.

FIG. 2 presents Table 2 showing the characteristics of the glass fiber.

FIG. 3 presents Table 5 showing the thermoplastic compositions with glass fiber.

FIG. 4 presents Table 6A showing the polycarbonate compositions with non-bonding glass fiber.

FIG. 5 presents Table 6B showing the performance of the polycarbonate compositions with non-bonding glass fiber.

DETAILED DESCRIPTION

Polycarbonate materials are often processed with other materials to improve their physical performance. Flame retardant additives may be included so that the polycarbonate resists flames making the material more useful for certain applications. Demand for non-brominated flame retardant additives has increased because these additives avoid release of certain halogenated chemicals when the matrix polymer is under environmental stresses that may cause degradation, melting, or burning. The market trend in Europe and Pacific for electrical housings and enclosures is to go to non-brominated (non-Br) flame retardant (FR) glass filled resins and International Electrotechnical Commission (IEC) electrical industry norms under preparation aim to limit halogen content in final electrical and electronic products. However, the addition of fillers and flame retardant additives to polycarbonate compositions may negatively affect impact performance and other mechanical properties. Filler reinforced polycarbonate compositions, also having robust flame-retardant properties, thus present significant technical challenges in discovering compositions that can maintain the appropriate balance of flow, thin wall flame retardancy, and impact strength. Conventional non-bromine FR glass filled polycarbonates include LEXAN™ 505RU, however the grade may have a lower impact and flame performance than its bromine-containing counterpart LEXAN™ 503R. The compositions of the present disclosure provide bromine and chlorine free, glass filled polycarbonate compositions exhibiting similar impact performance and a robust flame performance for thin-walled applications when compared to a brominated flame retardant PC contemporary. The use of certain additives and glass fiber filler with non-brominated flame retardant additives provided improved impact strength and maintained flame retardant performance.

Polycarbonate Polymer

In an aspect, the disclosed compositions may comprise a polycarbonate polymer component comprising one or more polycarbonate polymers. As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

The terms "polycarbonate" or "polycarbonates" as used herein include copolycarbonates, homopolycarbonates, (co) polyester carbonates and combinations thereof.

In various aspects, the polycarbonate may comprise copolymers comprising two or more distinct carbonate units. For example, a polycarbonate copolymer may comprise repeating carbonate units derived from bisphenol acetophenone (BisAP) and a second, chemically distinct dihydroxy monomer such as a bisphenol, e.g. bisphenol A. Alternatively, a polycarbonate copolymer can comprise repeating carbonate units derived from (N-Phenyl Phenolphthalein) PPPBP and a second, chemically distinct dihydroxy monomer such as a bisphenol, e.g. bisphenol A.

In one aspect, the polycarbonate can comprises aromatic carbonate chain units and includes compositions having structural units of the formula (I):

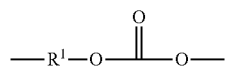
(I)

in which the $R^1$ groups are aromatic, aliphatic or alicyclic radicals. Beneficially, $R^1$ is an aromatic organic radical and, in an alternative aspect, a radical of the formula (II):

-$A^1$-$Y^1$-$A^2$-     (II)

wherein each of $A^1$ and $A^2$ is a monocyclic divalent aryl radical and $Y^1$ is a bridging radical having zero, one, or two atoms which separate $A^1$ from $A^2$. In an exemplary aspect, one atom separates $A^1$ from $A^2$. Illustrative examples of radicals of this type are —O—, —S—, —S(O)—, —S($O_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another aspect, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates can be produced by the interfacial reaction polymer precursors such as dihydroxy compounds in which only one atom separates $A^1$ and $A^2$. As used herein, the term "dihydroxy compound" includes, for example, bisphenol compounds having general formula (III) as follows:

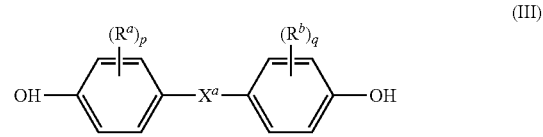
(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

(IV)

wherein $R^c$ and $R^d$ each independently represent a hydrogen atom or a monovalent linear or cyclic hydrocarbon group, and $R^e$ is a divalent hydrocarbon group.

Non-limiting examples of the types of bisphenol compounds that can be represented by formula (IV) can include the bis(hydroxyaryl)alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl) propane, or the like; bis(hydroxyaryl)cycloalkane series such as, 1,1-bis(4-hydroxyphenyl)cyclopentane, 1,1-bis(4-hydroxyphenyl)cyclohexane, or the like, or combinations including at least one of the foregoing bisphenol compounds.

Other bisphenol compounds that can be represented by formula (III) include those where X is —O—, —S—, —SO— or —$SO_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations including at least one of the foregoing bisphenol compounds.

Other bisphenol compounds that can be utilized in the polycondensation of polycarbonate are represented by the formula (V)

(V)

wherein, $R^f$, is a halogen atom of a hydrocarbon group having 1 to 10 carbon atoms or a halogen substituted hydrocarbon group; n is a value from 0 to 4. When n is at least 2, $R^f$ can be the same or different. Examples of bisphenol compounds that can be represented by the formula (IV), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafluoro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations including at least one of the foregoing bisphenol compounds.

In one aspect, the bisphenol compound is bisphenol A. In an exemplary aspect, the polycarbonate polymer component comprises a bisphenol A polycarbonate polymer. In another exemplary aspect, the polycarbonate component comprises a blend of at least two different grade bisphenol A polycarbonates. To that end, a polycarbonate grade may, for example, be characterized by the melt volume rate (MVR) of the polycarbonate. For example, a disclosed polycarbonate, such as a bisphenol A polycarbonate, may be characterized by exhibiting a melt Volume Rate (MVR) in the range of from 4 gram per 10 minutes (g/10 min) to 30 g/10 min at 300° C./1.2 kg. For example, the MVR can range from 10 g/10 min to 25 g/10 min, including for example a MVR in the range of from 15 g/10 min to 20 g/10 min. Further, for example, the MVR can be in the range of from 4 g/10 min or 30 g/10 min.

Polycarbonates may include linear bisphenol-A polycarbonates produced by melt polymerization. The melt polycarbonate process is based on continuous reaction of a dihydroxy compound and a carbonate source in a molten stage. For example, the polycarbonate polymer may be linear bisphenol-A polycarbonates produced by melt polymerization. The melt polycarbonate process is based on continuous reaction of a dihydroxy compound and a carbonate source in a molten stage. A melt polycarbonate in some aspects may have a molecular weight (Mw) of about 15,000 to about 120,000 Dalton on a polystyrene basis. The melt polycarbonate product may have an endcap level of about 45% to about 80%. Some polycarbonates have an endcap level of about 45% to about 75%, about 55% to about 75%, about 60% to about 70% or about 60% to about 65%. Certain polycarbonates have at least 200 parts per million (ppm) of hydroxide groups. Certain polycarbonates have 200-1100 ppm or 950 to 1050 ppm hydroxide groups.

The polycarbonate polymer may contain endcapping agents. Any suitable endcapping agents can be used provided that such agents do not significantly adversely impact the desired properties of the polycarbonate composition (transparency, for example). Endcapping agents include mono-phenolic compounds, mono-carboxylic acid chlorides, and/or mono-chloroformates. Mono-phenolic endcapping agents are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol.

Additionally, some polycarbonates include from about 200 to about 2000 ppm, or from about 250 parts per million (ppm) to about 1800 ppm Fries products. Fries products include ester type of structures A, B, and C.

Apart from the main polymerization reaction in polycarbonate production, there is a series of side reactions consisting of chain rearrangements of the polymer backbone that lead to branching that are often referred to as Fries rearrangement. The Fries species specifically found in bisphenol A melt polycarbonates include the ester type of structures A, B, and C.

Linear Fries:

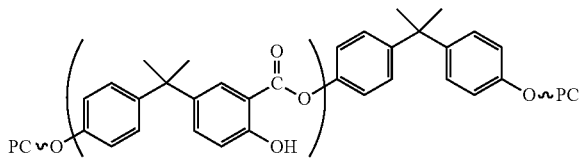

Branched Fries:

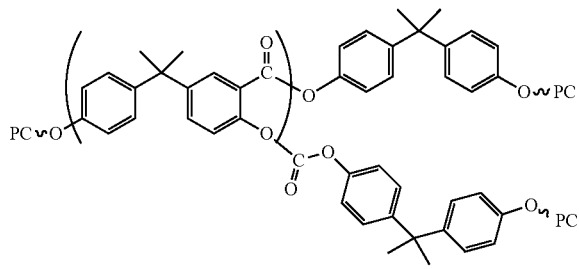

Acid Fries:

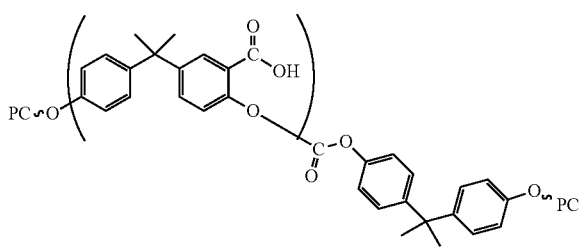

The Fries reaction is induced by the combined effect of basic catalysts, temperature, and residence time, which generally result in melt-produced polycarbonates being branched as compared with the interfacial polycarbonates since their manufacturing temperatures are lower. Because high branching levels in the resin can have a negative effect on the mechanical properties of the polycarbonate (for example, on impact strength), a product with lower branched Fries product may be desirable.

In certain embodiments, polycarbonate produced by interfacial polymerization may be utilized. In some processes, bisphenol A and phosgene are reacted in an interfacial polymerization process. Typically, the disodium salt of bisphenol A is dissolved in water and reacted with phosgene which is typically dissolved in a solvent that not miscible with water (such as a chlorinated organic solvent like methylene chloride).

In some embodiments, the polycarbonate comprises interfacial polycarbonate having a weight average molecular weight of from about 10,000 grams per mole (g/mol) to about 50,000 g/mol preferably about 15,000 g/mol to about 45,000 g/mol. Some interfacial polycarbonates have an endcap level of at least 90% or preferably 95%.

In at least one aspect, the composition may include a first and second polycarbonate as the polycarbonate polymer component. In a further aspect, the polycarbonate polymer may comprise at least one bisphenol-A polycarbonate polymer. Non-limiting examples of the polycarbonate may include homopolymers LEXAN™ 105 and/or LEXAN™ 175, both available from SABIC™. In some compositions, the polycarbonate polymer comprises at least one polycarbonate polymer having a molecular weight (Mw) of less than 25,000 g/mol, for example about 21,800 g/mol, and a second polycarbonate polymer have a molecular weight (Mw) of at least 28,000 g/mol, for example 30,000 g/mol. In some compositions, the molar ratio of said first polycarbonate polymer to said second polycarbonate polymer is from about 7:1 to about 4:1.

Polycarbonates" and "polycarbonate polymers" as used herein can further include blends of polycarbonates with other copolymers comprising carbonate chain units. An exemplary copolymer is a polyester carbonate, also known as a copolyester-polycarbonate. Such copolymers further contain, in addition to recurring carbonate chain units, repeating units of formula (VI)

$$\overset{O}{\underset{\|}{C}}-T-\overset{O}{\underset{\|}{C}}-O-D-O- \quad (VI)$$

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one aspect, D is a $C_{2-6}$ alkylene radical. In another aspect, D is derived from an aromatic dihydroxy compound of formula (VII):

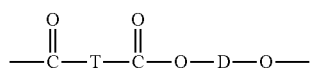

(VII)

wherein each $R^h$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (VIII) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propylhydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that can be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific aspect, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other aspects, poly(alkylene terephthalates) can be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), polybutylene naphthalate (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly (cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (IX):

(VIII)

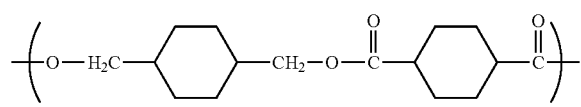

wherein, as described using formula (VIII), D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polycarbonate polymer component can also comprise a polycarbonate-polysiloxane copolymer. As used herein, the term "polycarbonate-polysiloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. The polysiloxane-polycarbonate copolymer comprises polydiorganosiloxane blocks comprising structural units of the general formula IX) below:

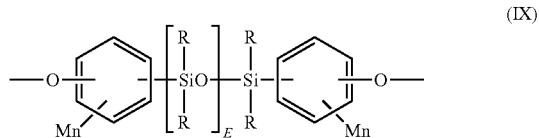

(IX)

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (X) below:

(X)

wherein at least 60 percent of the total number of $R^1$ groups comprise aromatic moieties and the balance thereof comprise aliphatic, alicyclic, or aromatic moieties. Polysiloxane-polycarbonates materials include materials disclosed and described in U.S. Pat. No. 7,786,246, which is hereby incorporated by reference in its entirety for the specific purpose of disclosing various compositions and methods for manufacture of same. Non-limiting examples of polysiloxane-polycarbonate copolymers can comprise various copolymers available from SABIC™ Innovative plastics.

In various aspects, the polycarbonate polymer component is present in an amount from about 60 wt. % to about 98 wt. % of the total weight of the composition. In a still further aspect, the polycarbonate polymer is present in an amount from about 40 wt. % to about 90 wt %. In a yet further aspect, the polycarbonate polymer is present in an amount from about 70 wt. % to about 85 wt. %, or from about 50 wt. % to about 90 wt. %, or from about 60 wt. % to about 90 wt. %, or from about 65 wt. % to about 90 wt. %, or from about 67 wt. % to about 90 wt. %, or from about 69 wt. % to about 90 wt. %, or from about 70 wt. % to about 89 wt. %, or from about 70 wt. % to about 88 wt. %, or from about 70 wt. % to about 88 wt. %, or from about 70 wt. % to about 85 wt. %, or from about 70 wt. % to about 80 wt. %, or from about 40 wt. % to about 95 wt. %, or from about 50 wt. % to about 95 wt. %, or from about 55 wt. % to about 95 wt. %, or from about 60 wt. % to about 95 wt. %, or from about 65 wt. % to about 95 wt. %, or from about 70 wt. % to about 95 wt. %, or from about 75 wt. % to about 95 wt. %, or from about 77 wt. % to about 95 wt. %. As an example, the polycarbonate polymer is present an amount about 50 wt. %. In a yet further aspect, the polycarbonate polymer is present in an amount of about 60 wt. %. In an even further aspect, the polycarbonate polymer is present in an amount of about 70 wt. %.

Glass Fiber

According to aspects of the present disclosure, the disclosed compositions may comprise a non-bonding glass fiber. In some examples, a non-bonding glass fiber included as a fiber filler in the present disclosure may provide a composition having a higher impact strength than a substantially similar composition comprising a bonding glass fiber. Substantially similar composition may refer to a composition comprising the same components but for a specified component. However, while a non-bonding glass fiber may improve impact strength properties in some of the non-brominated and non-chlorinated flame retardant formulations evaluated herein, the robustness of flame performance for thin-walled applications (less than 1.5 mm or less than 0.8 mm) may be poorer. A combination of the non-bonding glass fiber filler with certain stabilizer additives in the polycarbonate composition may improve both impact strength and maintain flame performance.

A non-bonding glass fiber, also characterized as a non-binding glass fiber, may refer to a glass fiber filler that does not provide specific adhesion to a polymer resin to which it is added. That is, individual fibers of the glass fiber filler may not demonstrate an affinity towards the polymer matrix. Comparatively, bonding glass fiber provides specific adhesion with the specific polymer resin to which it is added. A bonding glass fiber filler may exhibit affinity toward the polycarbonate resin matrix. This affinity may be attributed to the glass sizing, among a number of other forces.

In one aspect, the disclosed compositions comprise a non-bonding glass fiber selected from E-glass, S-glass, AR-glass, T-glass, D-glass and R-glass. In a still further aspect, the non-bonding glass fiber may be selected from E-glass, S-glass, and combinations thereof. In one example, the non-bonding glass fiber is an E-glass or EC glass type.

The non-bonding glass fibers can be made by standard processes, e.g., by steam or air blowing, flame blowing, and mechanical pulling. Exemplary glass fibers for polycarbonate reinforcement are made by mechanical pulling.

The non-bonding glass fibers may be sized or unsized. Sized glass fibers are coated on their surfaces with a sizing composition selected for compatibility with the polycarbonate. The sizing composition facilitates wet-out and wet-through of the polycarbonate upon the fiber strands and assists in attaining desired physical properties in the polycarbonate composition. In various further aspects, the non-bonding glass fiber is sized with a coating agent. In a further aspect, the coating agent is present in an amount from about 0.1 wt % to about 5 wt % based on the weight of the glass fibers. In a still further aspect, the coating agent is present in an amount from about 0.1 wt % to about 2 wt % based on the weight of the glass fibers.

In preparing the glass fibers, a number of filaments can be formed simultaneously, sized with the coating agent and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt %, about 0.1 to 2 wt % based on the weight of the glass fibers. Generally, this may be about 1.0 wt % based on the weight of the glass filament.

In a further aspect, the non-bonding glass fiber may be continuous or chopped. In some examples, the glass fiber is chopped. Glass fibers in the form of chopped strands may have a length of about 0.3 millimeter to about 10 centimeters, specifically about 0.5 millimeter to about 5 centimeters, and more specifically about 1.0 millimeter to about 2.5 centimeters. In various further aspects, the glass fiber has a length from about 0.2 mm to about 20 mm. In a yet further aspect, the glass fiber has a length from about 0.2 mm to about 10 mm. In an even further aspect, the glass fiber has a length from about 0.7 mm to about 7 mm. In this area, where a thermoplastic resin is reinforced with glass fibers in a composite form, fibers having a length of about 0.4 mm are generally referred to as long fibers, and shorter ones are referred to as short fibers. In a still further aspect, the glass fiber can have a length of 1 mm or longer. In yet a further aspect, the glass fiber can have a length of 2 mm or longer.

The non-bonding glass fiber component may be present in an amount from about greater than 0 wt % to about 20 wt %. In some examples, the non-bonding glass fiber may be present in an amount from greater than about 5 wt % to about 15 wt %. In a yet further aspect, the non-bonding glass fiber component may be present in an amount from greater than about 5 wt % to about 10 wt %. The disclosed thermoplastic composition may comprise from about 2 wt. % to about 20 wt. % of non-bonding glass fiber filler. For example, the glass fiber can be present in an amount of about 10 wt. %. In a still further aspect, the non-bonding glass fiber component may be present in an amount from greater than about 3 wt. % to about 10 wt. % or from about 3 wt. % to about 8 wt. %.

The non-bonding glass fiber may have a round (or circular), flat, or irregular cross-section. Thus, use of non-round fiber cross sections is possible. However, in some examples, the non-bonding glass fiber may have a circular cross-section. The width or diameter of the non-bonding glass fiber may be from about 1 micrometer (μm) to about 20 μm, or from about 5 to about 20 μm. In a further example, the width or diameter of the glass fiber may be from about 5 to about 15 μm. In certain compositions, the non-bonding glass fiber may have a width or diameter of about 14 μm.

Flame Retardant

In certain aspects of the present disclosure, the thermoplastic compositions can comprise a flame retardant additive. The flame retardant additive may comprise a flame retardant material or mixture of flame retardant materials suitable for use in the disclosed polycarbonate compositions. In an example, the flame retardant additive m comprise a phosphate containing material.

In various aspects, the flame retardant additive may be free of or substantially free of bromine or chlorine. Free of, or substantially free of, may refer to less than about 1 wt. % or more specifically, less than about 0.1 wt. % present in the total weight of a composition. In certain examples, the polycarbonate is substantially free of bromine or chlorine atoms. In further examples, the flame retardant additive is substantially free of bromine or chlorine atoms. By "substantially free" it is intended that less than about 1 wt. %, or less than about 0.1 wt. %, of the polycarbonate composition comprises bromine and/or chlorine atoms.

Non-bromine/non-chlorine phosphorus-containing flame retardants may include, for example, organic phosphates and organic compounds containing phosphorus-nitrogen bonds. The flame retardant optionally is a non-bromine or non-chlorine based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate.

The flame retardant additive may comprise an oligomer organophosphorus flame retardant, including for example, bisphenol A diphenyl phosphate (BPADP). In a further example, the flame retardant can be selected from oligomeric phosphate, polymeric phosphate, oligomeric phosphonate, ammonium polyphosphate (Exolit™ OP) or mixed phosphate/phosphonate ester flame retardant compositions. The flame retardant can be selected from triphenyl phosphate; cresyldiphenylphosphate; tri(isopropylphenyl)phosphate; resorcinol bis(diphenylphosphate); and bisphenol-A bis(diphenyl phosphate). In an aspect, the flame retardant can comprise bisphenol A bis(diphenyl phosphate) (BPDAP).

In some examples, the flame retardant additives may include, for example, flame retardant salts such as alkali metal salts of perfluorinated C1-C16 alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as sodium carbonate $Na_2CO_3$, potassium carbonate $K_2CO_3$, magnesium carbonate $MgCO_3$, calcium carbonate $CaCO_3$, and barium carbonate $BaCO_3$ or fluoro-anion complex such as trilithium aluminum hexafluoride $Li_3AlF_6$, barium silicon fluoride $BaSiF_6$, potassium tetrafluoroborate $KBF_4$, tripotassium aluminum hexafluoride $K_3AlF_6$, potassium aluminum fluoride $KAlF_4$, potassium silicofluoride $K_2SiF_6$, and/or sodium aluminum hexafluoride $Na_3AlF_6$ or the like. Rimar salt and KSS and NATS (sodium toluene sulfonic acid), alone or in combination with other flame retardants, are particularly useful in the compositions disclosed herein.

Metal synergists, e.g., antimony oxide, may also be used with the flame retardant additive. A flame retardant can be present in amounts of 1 to 25 parts by weight, more specifically 2 to 20 parts by weight, based on 100 parts by weight of the total composition, excluding any filler.

The flame retardant may be present in an amount of from about 0.01 wt. % to about 1 wt. % based on the total weight of the composition. For example, the flame retardant may be present in an amount of from about 0.05 wt. % to about 0.5 wt. %, or from about 0.05 wt. % to about 0.25 wt. % based on the total weight of the composition.

Additives

According to aspects of the present disclosure, the disclosed compositions may comprise a non-bonding glass fiber. The impact strength of the flame retardant, glass fiber filled polycarbonate polymers may depend upon the type of glass fiber used. While a non-bonding glass fiber may improve impact strength properties in some of the non-brominated and/or non-chlorinated flame retardant formulations evaluated herein, the robustness of flame performance for thin-walled applications (less than 1.5 mm or less than 0.8 mm) was reduced. Combining the non-bonding glass fiber filler with a certain additive mixture both improved impact strength and maintained flame performance.

The disclosed additive mixture may comprise an acid stabilizer and a phosphorous-based heat stabilizer or the disclosed additive mixture may comprise a plurality of phosphorous-based heat stabilizers. A combination of an acid stabilizer and a phosphorous-based heat stabilizer with the non-bonding glass fibers has been shown to both improve multi-axial impact strength and maintain thin-walled flame retardancy.

In some aspects, the additive may comprise a heat stabilizer additive. In some aspects the heat stabilizer component includes at least one organophosphorus compound, including but not limited to a phosphite, phosphine or phosphonite compound. In particular aspects, the heat stabilizer component includes tris-(2,4-di-tert-butylphenyl) phosphite (e.g., Irgafos™ 168, available from BASF) (IRG), triphenylphosphine (TPP), tridecylphosphite (TDP), tetrakis(2,4-di-tert-butylphenyl)-4,4-diphenyldiphosphonite) (PEPQ), bis (2,4-dicumylphenyl) pentaerythritol diphosphite (e.g., Doverphos™ S-9228, available from Dover Chemical) (DP), diphenyl monodecyl phosphite (DPDP), or combinations thereof.

In an example, the disclosed composition may comprise tetrakis(2,4-di-tert-butylphenyl)-4,4-diphenyldiphosphonite as a phosphorous based stabilizer as provided above. Tetrakis(2,4-di-tert-butylphenyl)-4,4-diphenyldiphosphonite) is commercially available as phosphonite PEPQ and may be represented by the following structural formula. PEPQ is a diphenolic phosphonite.

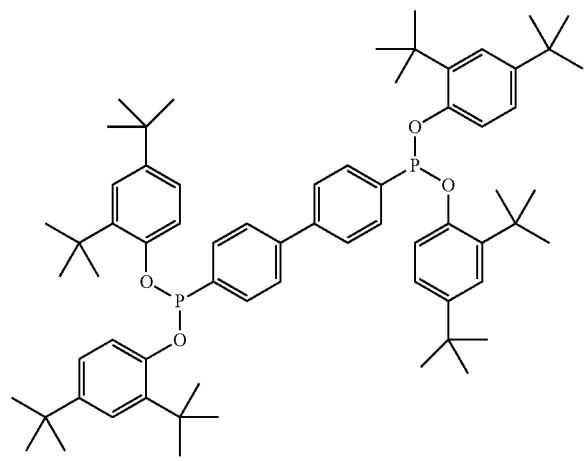 [SMILES: CC(C)(C)c1ccc(OP(Oc2ccc(C(C)(C)C)cc2C(C)(C)C)c2ccc(-c3ccc(P(Oc4ccc(C(C)(C)C)cc4C(C)(C)C)Oc4ccc(C(C)(C)C)cc4C(C)(C)C)cc3)cc2)c(C(C)(C)C)c1]

In a specific example, the disclosed composition may comprise a diphenolic diphosphate such as bis (2,4-dicumylphenyl) pentaerythritol diphosphite as a phosphorous based stabilizer as provided above. Bis (2,4-dicumylphenyl) pentaerythritol diphosphiteis commercially available as Doverphos™ S-9228 and may be represented by the following structural formula.

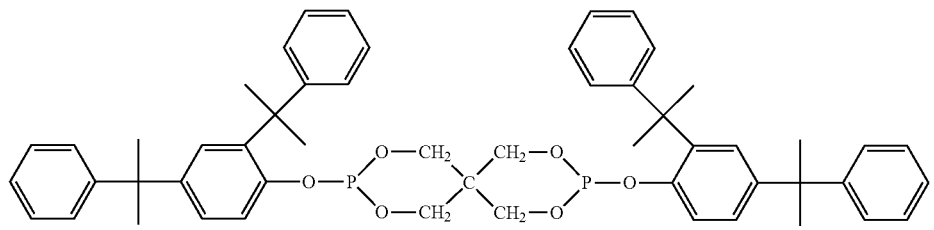 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

In some aspects the phosphorous based stabilizer component is present in the molded article in an amount of from about 0.01 to about 0.2 wt % of the composition, or in certain aspects in an amount of from about 0.01 to about 0.08 wt % of the composition.

An acid stabilizer component in some aspects may be present in the disclosed composition. In certain aspects the acid stabilizer component comprises a sulfonic acid ester. Other acid stabilizer additives may include organophosphorus compounds, including but not limited to phosphorous acid, phosphoric acid, or a combination thereof. In particular aspects, butyl tosylate (e.g., butyl p-toluenesulfonate, or BuTos) may be present in the disclosed compositions. As an example, BuTos may be used as a component of a polymer masterbatch, where the polymer masterbatch comprises about 0.3 wt. % of BuTos using 14 wt. % pentaerythritol tetrastearate. In certain examples of the present disclosure, a sulfonic acid ester such as butyl tosylate may provide a polycarbonate composition exhibiting better physical and mechanical properties (e.g., FR and multi-axial impact (MAI)) than a polycarbonate composition comprising a phosphorous acid as the acid stabilizer. In some aspects the acid stabilizer component is present in the molded article in an amount of from about 0.001 wt. % to about 5 wt. % in the composition, or in certain aspects in an amount of from about 0.001 wt. % to about 1 wt. % in the composition, or in yet further aspects in an amount from about 0.001 to about 0.05 wt. %.

In a specific example, butyl tosylate as an acid stabilizer and tris-(2,4-di-tert-butylphenyl) phosphite a heat stabilizer have been combined with non-bonding glass fiber and a non-bromine/non-chlorine FR (Rimar salt) to provide a polycarbonate composition exhibiting improved multiaxial impact strength and robust flame retardant performance. These disclosed compositions exhibited better flame retardant FR and MAI properties than a substantially similar polycarbonate composition having a bonding glass fiber and/or in the absence of butyl tosylate or multiple phosphorous-based heat stabilizers.

The disclosed polycarbonate composition may comprise one or more additional additives conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composite mixture. For example, the disclosed composition can comprise one or more additional fillers, plasticizers, stabilizers, anti-static agents, impact modifiers, colorant, antioxidant, and/or mold release agents. In one aspect, the composition can further comprises one or more additives selected from an antioxidant, a mold release agent, and stabilizer.

The composition disclosed herein can comprise one or more fillers. The filler can be selected to impart additional impact strength and/or provide additional characteristics that can be based on the final selected characteristics of the polymer composition. In some aspects, the filler(s) can comprise inorganic materials which can include clay, titanium oxide, asbestos fibers, silicates and silica powders, boron powders, calcium carbonates, talc, kaolin, sulfides, barium compounds, metals and metal oxides, wollastonite, glass spheres, glass fibers, flaked fillers, fibrous fillers, natural fillers and reinforcements, and reinforcing organic fibrous fillers.

Appropriate fillers or reinforcing agents can include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Fillers generally can be used in amounts of 1 to 200 parts by weight, based on 100 parts by weight of based on 100 parts by weight of the total composition. In various aspects, the filler can comprise talc. For example, the thermoplastic composition can comprise fine talc as a filler. The talc filler can have an average diameter of from about 0.1 microns (micrometers, μm) to about 4.0 μm.

The thermoplastic composition can comprise an antioxidant. The antioxidants can include either a primary or a secondary antioxidant. For example, antioxidants can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations including at least one of the foregoing antioxidants. Antioxidants can generally be used in amounts of from 0.01 to 0.5 parts by weight, based on 100 parts by weight of the total composition, excluding any filler.

In various aspects, the thermoplastic composition can comprise a mold release agent. Exemplary mold releasing agents can include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from about 0.1 to about 1.0 parts by weight, based on 100 parts by weight of the total composition, excluding any filler.

In an aspect, the thermoplastic composition can comprise a heat stabilizer. As an example, heat stabilizers can include, for example, organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers can generally be used in amounts of from 0.01 to 0.5 parts by weight based on 100 parts by weight of the total composition, excluding any filler.

In further aspects, light stabilizers can be present in the thermoplastic composition. Exemplary light stabilizers can include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers can generally be used in amounts of from about 0.1 to about 1.0 parts by weight, based on 100 parts by weight of the total composition, excluding any filler.

The thermoplastic composition can also comprise plasticizers. For example, plasticizers can include phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from about 0.5 to about 3.0 parts by weight, based on 100 parts by weight of the total composition, excluding any filler.

In further aspects, the disclosed composition can comprise antistatic agents. These antistatic agents can include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Ultraviolet (UV) absorbers can also be present in the disclosed thermoplastic composition. Exemplary ultraviolet absorbers can include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

The thermoplastic composition can further comprise a lubricant. As an example, lubricants can include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants can generally be used in amounts of from about 0.1 to about 5 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. In one example, TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. An antidrip agent, such as TSAN, can be used in amounts of 0.1 to 10 parts by weight, based on 100 parts by weight of the total composition, excluding any filler.

Additionally, additives to improve flow and other properties may be added to the composition, such as low molecular weight hydrocarbon resins. These materials are also known as process aids. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Properties and Articles

The polycarbonate compositions described herein may be used to form robust flame retardant having improved multi-axial impact strength and notched impact strength.

In certain aspects of the present disclosure, the combination of a polycarbonate composition, a non-bromine or non-chlorine flame retardant, a non-bonding glass fiber filler, and certain types of stabilizers may further improve mechanical properties, such as multi-axial impact strength, while maintaining flame retardant performance when compared to a substantially similar composition.

Non-bonding glass fiber may provide a higher impact strength (both MAI and notched Izod) than bonding (or binding) glass fiber used as the fiber filler in a substantially similar polycarbonate composition but for the identity of the glass fiber filler (or, but for the bonding characteristics of the glass fiber filler). While a polycarbonate composition comprising the non-bonding glass fiber instead of the bonding glass fiber may exhibit improved impact strength, its flame retardant properties may be less robust. For example, a polycarbonate composition comprising non-bonding glass fiber may exhibit a longer flame out time (FOT) and improved probability of first time pass (pFTP) or flammability (V) value. Surprisingly, compositions of the present disclosure combine certain stabilizer additives with the improved impact strength properties afforded by the non-bonding glass fiber to provide polycarbonate compositions having improved multi-axial impact strength as well as robust flame retardant performance.

Compositions of the present disclosure exhibit a synergy among non-bonding glass fiber and stabilizers butyl tosylate and tris-(2,4-di-tert-butylphenyl)phosphite. A disclosed composition comprising non-bonding glass fiber, butyl tosylate and tris-(2,4-di-tert-butylphenyl)phosphite may exhibit higher MAI strength values tested in accordance with ISO6603 and shorter flame out times (FOT) tested in accordance UL 94 when compared to a substantially similar composition comprising a bonding glass fiber filler. Here, a substantially similar composition comprising bonding glass fiber filler may refer to a composition comprising at least the polycarbonate component, the bonding glass fiber filler, the butyl tosylate and the tris-(2,4-di-tert-butylphenyl)phosphite in the absence of a non-bonding glass fiber. A ratio of butyl tosylate to tris-(2,4-di-tert-butylphenyl)phosphite in compositions of the present disclosure may be from about 1:3 to about 1:50, specifically, from about 1:6 to about 1:17. A ratio of butyl tosylate to non-bonding glass fiber may be from about 1:750 to about 1:6000, more specifically from about 1:1000 to about 1:3000. A ratio of butyl tosylate to non-bonding glass fiber to tris-(2,4-di-tert-butylphenyl)phosphite may be about 1:10:2000.

In further aspects, compositions of the present disclosure exhibit a synergy between a non-bonding glass fiber and certain phosphite stabilizers. For example, a disclosed composition comprising non-bonding glass fiber and a bis (2,4-dicumylphenyl) pentaerythritol diphosphite stabilizer may exhibit higher MAI strength values tested in accordance with ISO6603 and shorter flame out times (FOT) when tested in accordance UL 94 when compared to a substantially similar composition comprising a bonding glass fiber filler. Here, a substantially similar composition comprising bonding glass fiber filler may refer to a composition comprising at least the polycarbonate component, the bonding glass fiber filler, and the a bis (2,4-dicumylphenyl) pentaerythritol diphosphite (or the tetrakis(2,4-di-tert-butylphenyl)-4,4-diphenyldiphosphonite)) in the absence of a non-bonding glass fiber. A ratio of non-bonding glass fiber to tetrakis(2,4-di-tert-butylphenyl)-4,4-diphenyldiphosphonite in compositions of the present disclosure may be about 200:1. A ratio of non-bonding glass fiber to bis (2,4-dicumylphenyl) pentaerythritol diphosphite in compositions of the present disclosure may be about 200:1.

In specific examples, butyl tosylate as an acid stabilizer and tris-(2,4-di-tert-butylphenyl) phosphite as a heat stabilizer have been combined with non-bonding glass fiber and a non-bromine/non-chlorine FR (Rimar salt) to provide a polycarbonate composition exhibiting improved MAI strength and robust flame retardant performance. These disclosed compositions, in the absence of talc, exhibited better FR and MAI properties than a substantially similar polycarbonate composition having a bonding glass fiber and/or in the absence of butyl tosylate. More specifically, the disclosed compositions exhibited an MAI puncture energy of greater than about 70 J at 23° C. when tested in accordance with ISO 6603, an energy at max for of greater than about 65 J at 23° C. when tested in accordance with ISO 6603, an impact strength of greater than about 10 kJ/m$^2$ when tested in accordance with ISO 6603, a flame out time (FOT) of less than about 60 seconds and 0% burning drips for 0.8 mm molded samples when tested in accordance with UL 94.

The properties of the disclosed polycarbonate compositions make them useful in a number of applications. The polycarbonate compositions may be particularly useful in applications where: thin-walled (less than 1 mm) flame retardancy, thin-walled impact strength, thin-walled multi-axial impact strength, and bromine-free/chlorine-free formulations are desired. Thus, the disclosed polycarbonate composition may be useful for electrical applications such as use as electrical device enclosures. The improved thin-walled MAI strength of the present disclosure may be even more useful for electrical device enclosures. MAI strength However, the disclosed polycarbonate compositions are not limited to the foregoing uses. The advantageous mechanical characteristics of the polycarbonate compositions disclosed herein can make them appropriate for an array of uses and the compositions may be used to provide any desired shaped, formed, or molded articles.

Suitable articles can be exemplified by, but are not limited to, aircraft and automotive vehicles, light fixtures and appliances, solar appliances; and like applications. The disclosure further contemplates additional fabrication operations on said articles, such as, but not limited to, molding, in-mold decoration, baking in a paint oven, lamination, and/or thermoforming. The articles made from the composition of the present disclosure may be used widely in automotive industry, home appliances, electrical components, and telecommunications.

In certain aspects, the present disclosure pertains to electrical or electronic devices comprising the thermoplastic compositions described herein. In a further aspect, the electrical or electronic device comprising the disclosed thermoplastic compositions can be a cellphone, a MP3 player, a computer, a laptop, a camera, a video recorder, an electronic tablet, a pager, a hand receiver, a video game, a calculator, circuit boards, a wireless car entry device, wireless devices, audio devices, scanner fax devices, an automotive part, a filter housing, a luggage cart, an office chair, a kitchen appliance, a display screen or film, an electrical housing or enclosure, an electrical connector, a lighting fixture, a light emitting diode, an electrical part, or a telecommunications part, among many others.

In a still further aspect, the thermoplastic compositions can also be present in overlapping fields, such as mechatronic systems that integrate mechanical and electrical properties which can, for example, be used in automotive or medical engineering. In various aspects, the present disclosure relates to articles comprising the compositions herein. The compositions may be molded into useful shaped articles by a variety of means such as injection molding, extrusion, rotational molding, blow molding and thermoforming to form articles. The thermoplastic compositions can be useful in the manufacture of articles requiring materials with thin wall flame retardancy and good impact strength.

In various aspects, the polycarbonate compositions may be prepared according to a variety of methods. The compositions of the present disclosure can be blended, compounded, or otherwise combined with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods can include, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the composition may processed in an extruder at temperatures from about 180° C. to about 350° C.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

Aspects

In various aspects, the present invention pertains to and includes at least the following aspects.

Aspect 1A. A composition comprising: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 1B. A composition consisting of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 1C. A composition consisting essentially of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 2A. A composition comprising: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 0.1 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 2B. A composition consisting essentially of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 0.1 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 2C. A composition consisting of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 0.1 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 3A. A composition comprising: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 0.05 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 3B. A composition consisting of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 0.05 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 3C. A composition consisting essentially of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 0.05 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 4. The composition of any of aspects 1A-3C, wherein the stabilizer additive component comprises butyl tosylate and a phosphorous based heat stabilizer.

Aspect 5. The composition of any of aspects 1A-3C, wherein the stabilizer additive component comprises butyl tosylate and tris(di-t-butylphenylphosphite).

Aspect 6. The composition of any of aspects 1A-5, wherein the butyl tosylate and non-bonding glass fiber are present in a ratio of from about 1:750 to about 1:6000 of butyl tosylate to non-bonding glass fiber.

Aspect 7. The composition of any of aspects 1A-5, wherein the butyl tosylate and non-bonding glass fiber are present in a ratio of from about 1:1000 to about 1:3000 of butyl tosylate to non-bonding glass fiber.

Aspect 8. The composition of any of aspects 1A-5, wherein the butyl tosylate and non-bonding glass fiber are present in a ratio of about 1:1200 butyl tosylate to non-bonding glass fiber.

Aspect 9. The composition of any of aspects 1A-5, wherein the butyl tosylate and non-bonding glass fiber are present in a ratio of about 1:3100 butyl tosylate to non-bonding glass fiber.

Aspect 10. The composition of any of aspects 1A-9, further comprising styrene encapsulated polytetrafluoroethylene.

Aspect 11. The composition of aspect 10, wherein the styrene encapsulated polytetrafluoroethylene is present an amount of from about 0.1 wt. % to about 1 wt. %.

Aspect 12. The composition of aspect 10, wherein the styrene encapsulated polytetrafluoroethylene is present an amount of from about 0.3 wt. % to about 0.7 wt. %.

Aspect 13. The composition of aspect 10, wherein the styrene encapsulated polytetrafluoroethylene is present an amount of about 0.5 wt. %.

Aspect 14. A composition comprising: from about 70 wt. % to about 98 wt. % of a polycarbonate polymer component; from about 0.01 wt. % to about 1 wt. % of a flame retardant additive, wherein the flame retardant additive is free or substantially free of bromine and/or chlorine; from about 2 wt. % to about 20 wt. % of a non-bonding glass fiber; and from about 0.01 wt. % to about 5 wt. % of a stabilizer component wherein the stabilizer component comprises one or more of bis (2,4-dicumylphenyl) pentaerythritol diphosphite or tetrakis(2,4-di-tert-butylphenyl)-4,4-biphenyl-diphosphonite (PEPQ), wherein a molded sample formed from the composition exhibits a MAI rating energy at max force of greater than about 60 Joules at 23 degrees Celsius (° C.) when tested in accordance with ISO6603 standard and wherein a molded sample of the composition achieves a V2 rating at a thickness of about 0.8 mm UL 94.

Aspect 15. A composition comprising: from about 70 wt. % to about 98 wt. % of a polycarbonate polymer component; from about 0.01 wt. % to about 1 wt. % of a flame retardant additive, wherein the flame retardant additive is free or substantially free of bromine and/or chlorine; from about 5 wt. % to about 15 wt. % of a non-bonding glass fiber; and from about 0.01 wt. % to about 1 wt. % of a stabilizer component wherein the stabilizer component comprises one or more of bis (2,4-dicumylphenyl) pentaerythritol diphosphite or tetrakis(2,4-di-tert-butylphenyl)-4,4-biphenyl-diphosphonite (PEPQ), wherein a molded sample formed from the composition exhibits a MAI rating energy at max force of greater than about 60 Joules at 23 degrees Celsius (° C.) when tested in accordance with ISO6603 standard and wherein a molded sample of the composition achieves a V2 rating at a thickness of about 0.8 mm UL 94.

Aspect 16. The composition of aspects 15A-C, wherein a ratio of non-bonding glass fiber to bis (2,4-dicumylphenyl) pentaerythritol diphosphite is from about 180:1 to about 210:1.

Aspect 17. The composition of aspects 15A-C, wherein a ratio of non-bonding glass fiber to tetrakis(2,4-di-tert-butylphenyl)-4,4-biphenyldiphosphonite is from about 180:1 to about 210:1.

Aspect 18. The composition of any of aspects 1A-17, further comprising one or more additional additives.

Aspect 19. The composition of aspect 18, wherein the one or more additional additives comprise a plasticizer, an anti-static agent, an impact modifier, a colorant, an antioxidant, a mold release agent, an UV absorber, a lubricant, or a blowing agent, or a combination thereof.

Aspect 20. The composition of any one of aspects 1A-19, wherein the non-bonding glass fiber has a width of from about 10 micrometer (μm) to about 15 μm.

Aspect 21. The composition of any one of aspects 1A-20, wherein the non-bonding glass fiber has a length of from about 2 mm to about 6 mm.

Aspect 22. The composition of any one of aspects 1A-21, wherein the non-bonding glass fiber has a diameter or a width of about 13 μm and a length of 4 mm.

Aspect 23. The composition of any one of aspects 1A-22, wherein the flame retardant additive comprises potassium perfluorobutanesulfonate.

Aspect 24. The composition of any of one of aspects 1A-23, wherein the polycarbonate polymer component comprises one or more polycarbonate polymers derived from bisphenol A.

Aspect 25. The composition of any one of aspects 1A-24, wherein the polycarbonate polymer component comprises a polycarbonate having an average molecular weight of from about 18,000 grams per mole to about 35,000 grams per mole.

Aspect 26. The composition of any one of aspects 1A-25, wherein the polycarbonate polymer component comprises a polycarbonate having an average molecular weight of from about 18,000 grams per mole to about 35,000 grams per mole.

Aspect 27. A method of forming the composition of any one of aspects 1A-26.

Aspect 28. A method of forming a composition comprising: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; and from about 0.001 to about 5 wt. % of a stabilizer additive component, wherein the stabilizer additive component comprises butyl tosylate, wherein the butyl tosylate and non-bonding glass fiber are present in a ratio of from about from about 1:1000 to about 1:3000 of butyl tosylate to non-bonding glass fiber.

Aspect 29. A method of forming a composition comprising: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; and from about 0.001 to about 0.1 wt. % of a stabilizer additive component, wherein the stabilizer additive component comprises butyl tosylate, wherein the butyl tosylate and non-bonding glass fiber are present in a ratio of from about from about 1:1000 to about 1:3000 of butyl tosylate to non-bonding glass fiber.

Aspect 30. A method of forming a composition comprising (consisting of or consisting essentially of): from about 70 wt. % to about 98 wt. % of a polycarbonate polymer component; from about 0.01 wt. % to about 1 wt. % of a flame retardant additive, wherein the flame retardant additive is free or substantially free of bromine and/or chlorine; and from about 2 to about 20 wt. % of a non-bonding glass fiber; and from about 0.001 to about 0.05 wt. % of a stabilizer additive component, wherein the stabilizer additive component comprises butyl tosylate, wherein the butyl tosylate and non-bonding glass fiber are present in a ratio of from about from about 1:1000 to about 1:3000 of butyl tosylate to non-bonding glass fiber.

Aspect 31. The method of aspect 30, wherein a molded sample formed from the composition exhibits a MAI rating energy at max force of greater than about 60 Joules when tested in accordance with ISO6603 standard, and wherein a molded sample of the composition achieves a V1 rating at a thickness of about 0.8 mm and a flame out time of less than about 60 seconds when tested in accordance with UL 94.

Aspect 32A. A composition comprising: from about 75 wt. % to about 99 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 32B. A composition consisting essentially of: from about 75 wt. % to about 99 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 32C. A composition consisting of: from about 75 wt. % to about 99 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 33A. A composition comprising: from about 80 wt. % to about 99 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 33B. A composition consisting essentially of: from about 80 wt. % to about 99 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 33C. A composition consisting of: from about 80 wt. % to about 99 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 34. A composition comprising: from about 70 wt. % to about 95 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 34B. A composition consisting essentially of: from about 70 wt. % to about 95 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 34C. A composition consisting of: from about 70 wt. % to about 95 wt. % of a polycarbonate polymer component; from about 0.01 to about 1 wt. % of a flame retardant additive, wherein the flame retardant additive is free or substantially free of bromine and/or chlorine; and from about 2 to about 20 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 35. A composition comprising: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 10 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 35. A composition consisting essentially of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 10 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Aspect 35. A composition consisting of: from about 70 wt. % to about 98 wt. % of a polycarbonate polymer component; from about 0.01 to about 1 wt. % of a flame retardant additive, wherein the flame retardant additive is free or substantially free of bromine and/or chlorine; and from about 2 to about 10 wt. % of a non-bonding glass fiber; from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94.

Examples

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

The following examples are provided to illustrate the compositions, processes, and properties of the present disclosure. The examples are merely illustrative and are not intended to limit the disclosure to the materials, conditions, or process parameters set forth therein.

General Materials and Methods

The compositions as set forth in the Examples below were prepared from the components described below. Table 1 shown in FIG. 1 presents types of polymers, additives, and glass fiber filler used.

Table 2 shown in FIG. 2 provides additional detail for characteristics of the glass fibers used including the dimensions of the fibers as well as the type of polymer to which the fiber is conventionally added.

Formulations were prepared by extrusion on a 25 mm twin screw extruder (Krupps Werner and Plefeiderer), according to the extrusion profile indicated in Table 3. All powders were blended using a paint shaker and fed through one feeder. The remaining PC was fed through a second feeder. The glass fiber was fed separately through the hopper or a downstream side-feeder. The extrudate was cooled using a water bath prior to pelletizing.

TABLE 3

| Compounding Settings | | |
|---|---|---|
| Extruder Die | Units | |
| Zone 1 Temp | ° C. | 180 |
| Zone 2 Temp | ° C. | 250 |
| Zone 3 Temp | ° C. | 270 |
| Zone 4 Temp | ° C. | 285 |
| Zone 5 Temp | ° C. | 285 |
| Zone 6 Temp | ° C. | 285 |
| Zone 7 Temp | ° C. | 285 |
| Zone 8 Temp | ° C. | 285 |
| Zone 9 Temp | ° C. | 285 |
| Die Temp | ° C. | 285 |
| Screw speed | rpm | 300 |
| Throughput | kg/hr | 18 |

The pellets obtained from extrusion were dried at 120° C. for two hours. Molding of 3 mm ISO parts (Izod bars, plaques) of UL bars was performed on an Engel® 75T molding machine. The injection molding parameters are set forth in Table 4.

TABLE 4

| Injection molding settings. | | |
|---|---|---|
| Molding Machine | | |
| Cnd: Pre-drying time | Hour | 2 |
| Cnd: Pre-drying temp | ° C. | 120 |
| Hopper temp | ° C. | 40 |
| Zone 1 temp | ° C. | 280 |
| Zone 2 temp | ° C. | 290 |
| Zone 3 temp | ° C. | 300 |

TABLE 4-continued

Injection molding settings.

Molding Machine

| | | |
|---|---|---|
| Nozzle temp | ° C. | 295 |
| Mold temp | ° C. | 90 |
| Screw speed | rpm | 100 |
| Back pressure | kgf/cm² | 5 |

Molded samples were then tested in accordance with the standards presented below.

The notched Izod impact ("NII") test was carried out on 80 mm×10 mm×3 mm molded samples (bars) with 2 mm notch, according to ISO180 at 0° C., −30° C. and 23° C. Data units are kJ/m².

Multi-axial impact (MAI) strength testing was performed according to ISO0633 at 0° C., −30° C. and 23° C. on disk specimens having a 100 mm diameter and a thickness of 3.2 mm with a speed of 4.4 meters per second (m/s).

Flammability tests were performed following the procedure of Underwriter's Laboratory Bulletin 94 entitled "Tests for Flammability of Plastic Materials, UL 94". Several ratings can be applied based on the rate of burning, time to extinguish, ability to resist dripping, and whether or not drips are burning. Specimens for testing were injection molded bars comprising of the injection molded thermoplastic composition. Each specimen had a thickness of either 0.8 millimeters (mm), 1.5 mm, or mm. Materials can be classified according to this procedure as UL 94 vertical burn (V0, V1, V2) on the basis of the test results obtained for five samples.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first (t1) and second (t2) ignitions is less than or equal to a maximum flame out time (t1+t2) of 250 seconds.

Flame-out-times may be as analyzed and described in U.S. Pat. No. 6,308,142 B1. Generally, the data may be analyzed by calculation of the average flame out time (avFOTsec). Hours are denoted h.

Samples were evaluated for the effect of the different types of glass fiber on impact strength properties and flame retardant properties. Results are presented in Table 5 in FIG. 3.

As described herein, while a non-bonding glass fiber shows improved impact properties, flame retardant properties may be less robust than a substantially similar composition comprising a bonding an alternative type of glass fiber. Example 2 (Ex2) comprising the non-bonding glass fiber has consistently higher values for MAI than all other types of glass fibers observed, that is Comparative examples 1 (CE1), comparative example 3 (CE3), comparative example 4 (CE4), Comparative Example 5 (Ex5) Comparative Example 6 (Ex6), and Comparative 7 (CE7). CE1 comprising the bonding GF exhibited the lowest MAI impact strength values. However, Ex2 had the poorest (longest duration) flame out time (FOT) of the examples observed (at 117 seconds at 23° C. for 0.8 millimeter thick molded samples). The thicker 1.5 mm sample for Ex. 2 exhibited the lowest FOT for samples tested at that thickness.

Samples were then prepared with non-bonding glass fiber and different combinations of stabilizer additives and evaluated for impact strengths and flame retardant properties. Results are presented in Tables 6A and 6B in FIG. 4.

CE1 and Ex2 are presented in Table 6 for reference showing that the non-bonding glass fibers provided better MAI than the bonding GF counterpart. Ex8 and CE9 introduce heat stabilizer butyl tosylate (BuTos) to the non-bonding glass fiber and acid stabilizer combination and show that the BuTos containing sample performed better with non-bonding glass fiber than with bonding glass fiber. Multi-axial impact and notched impact strength values increased while maintaining flame retardant properties (FOT) within 5% and burning drips at 0%. The FOT for Ex 8 are also reduced from 117 seconds observed for Ex2 and from 88.9 s observed for CE9. Example 10 further improved these properties by increasing the amount of BuTos. The all color V1 rating of Ex8 has been verified by UL certified lab under the experimental grade name, ER007338.

Comparative examples 10 (CE10) and 11 (CE11) include the non-bonding glass fiber and acid stabilizer Irgafos™ 168 combined with a phosphorous acid stabilizer ($H_3PO_3$, 45% in water). CE10 exhibited a MAI comparable to Ex2, but the FOT was much higher at 140 seconds. CE11 had a much lower MAI and a slightly lower, but still long FOT. Comparative Example 12 (CE12) increased the amount of phosphorous acid which slightly lowered the thin wall FOT, but also significantly decreased the MAI compared to CE11. CE11 and CE12 indicate that the combination of Irg168 and phosphorous acid do not improve MAI or FOT, and increasing phosphorous acid may negatively affect the MAI performance.

Example 13 (Ex13) and Comparative Example 14 introduce different phosphorous stabilizer additives, PEPQ and Doverphos S-9228. Ex13 having the phosphorous additive PEPQ with non-bonding glass fiber exhibited higher MAI and shorter FOT for both 0.8 mm and 1.5 mm samples compared to the bonding GF CE14. Comparative Example 15 (CE15) and Comparative Example 16 (CE16) include Doverphos instead of PEPQ. CE15, including the non-bonding GF exhibited much higher values for the MAI and a shorter FOT when compared to CE16 comprising the bonding GF. When compared to examples including phosphorous acid (CE11, CE12), the Doverphos S-9228 and PEPQ both provide better MAI and FR properties. It may be that the phosphorous acid and the Doverphos S-9228 (or the PEPQ) react with the polycarbonate in a different way. For example, PEPQ and Doverphos S-9228 may react more slowly than the phosphorous acid.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While aspects of the present disclosure can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this disclosure belongs.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. A value modified by a term or terms, such as "about" and "substantially," is intended to include the degree of error associated with measurement of the particular quantity based upon the equipment available at the time of filing this application. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

Disclosed are component materials to be used to prepare disclosed compositions as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

As used herein, the terms "number average molecular weight" or "Mn" can be used interchangeably, and refer to the statistical average molecular weight of all the polymer chains in the sample and is defined by the formula:

$$Mn = \frac{\Sigma N_i M_i}{\Sigma N_i}$$

$$Mn = \frac{\Sigma N_i M_i}{\Sigma N_i}$$

where $M_i$ is the molecular weight of a chain and $N_i$ is the number of chains of that molecular weight. Mn can be determined for polymers, such as polycarbonate polymers or polycarbonate-polysiloxane copolymers, by methods well known to a person having ordinary skill in the art.

As used herein, the terms "weight average molecular weight" or "Mw" can be used interchangeably, and are defined by the formula:

$$Mw = \frac{\Sigma N_i M_i^2}{\Sigma N_i M_i}$$

wherein Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured by gel permeation chromatography. In some cases, Mw can be measured by gel permeation chromatography and calibrated with polycarbonate standards. As an example, a polycarbonate of the present disclosure can have a weight average molecular weight of greater than about 5,000 Daltons based on PS standards. As a further example, the polycarbonate can have an Mw of from about 20,000 to about 100,000 Daltons.

What is claimed is:

1. A composition comprising:
    from about 70 wt. % to about 98 wt. % of a polycarbonate polymer component;
    from about 0.01 to about 1 wt. % of a flame retardant additive, wherein the flame retardant additive is free or substantially free of bromine and/or chlorine;
    from about 2 to about 20 wt. % of a non-bonding glass fiber; and
    from about 0.001 to about 5 wt. % of a stabilizer additive component, wherein the stabilizer additive component comprises butyl tosylate,
    wherein the butyl tosylate and non-bonding glass fiber are present in a ratio of from about 1:1000 to about 1:3000 of butyl tosylate to non-bonding glass fiber;
    wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94;
    wherein the weight percentages are based on the total weigh of the composition.

2. The composition of claim 1, wherein the stabilizer additive component comprises butyl tosylate and a phosphorous based heat stabilizer.

3. The composition of claim 1, wherein the stabilizer additive component comprises butyl tosylate and tris(di-t-butylphenylphosphite).

4. The composition of claim 1, further comprising one or more additional additives.

5. The composition of claim 4, wherein the one or more additional additives comprise a plasticizer, an anti-static agent, an impact modifier, a colorant, an antioxidant, a mold release agent, an UV absorber, a lubricant, or a blowing agent, or a combination thereof.

6. A composition comprising:
    from about 70 wt. % to about 98 wt. % of a polycarbonate polymer component;
    from about 0.01 to about 1 wt. % of a flame retardant additive, wherein the flame retardant additive is free or substantially free of bromine and/or chlorine;
    from about 2 to about 20 wt. % of a non-bonding glass fiber; wherein the non-bonding glass fiber has at least one of a width of from about 10 micrometer (μm) to about 15 μm, a length of from about 2 mm to about 6 mm, or a diameter or a width of about 13 μm and a length of 4 mm; and
    from about 0.001 to about 5 wt. % of a stabilizer additive component, wherein the stabilizer additive component comprises butyl tosylate,
    wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94;
    wherein the weight percentages are based on the total weigh of the composition.

7. The composition of claim 1, wherein the non-bonding glass fiber has the length of from about 2 mm to about 6 mm.

8. The composition of claim 1, wherein the non-bonding glass fiber has the diameter or the width of about 13 μm and the length of 4 mm.

9. The composition of claim 1, wherein the flame retardant additive comprises potassium perfluorobutanesulfonate.

10. The composition of claim 1, wherein the polycarbonate polymer component comprises one or more polycarbonate polymers derived from bisphenol A.

11. The composition of claim 1, wherein the polycarbonate polymer component comprises a polycarbonate having an average molecular weight of from about 18,000 grams per mole to about 35,000 grams per mole.

12. The composition of claim 1, wherein the polycarbonate polymer component comprises a polycarbonate having an average molecular weight of from about 18,000 grams per mole to about 35,000 grams per mole.

13. The composition of claim 1, further comprising a styrene encapsulated polytetrafluoroethylene, wherein the styrene encapsulated polytetrafluoroethylene is present in an amount from about 0.2 wt. % to about 1 wt. %.

14. A method of forming the composition of claim 1.

15. A method of forming the composition of claim 1 comprising:
    from about 70 wt. % to about 98 wt. % of a polycarbonate polymer component;

from about 0.01 to about 1 wt. % of a flame retardant additive, wherein the flame retardant additive is free or substantially free of bromine and/or chlorine; and from about 2 to about 20 wt. % of a non-bonding glass fiber; and from about 0.001 to about 5 wt. % of a stabilizer additive component, wherein the stabilizer additive component comprises butyl tosylate, wherein the butyl tosylate and non-bonding glass fiber are present in a ratio of from about from about 1:1000 to about 1:3000 of butyl tosylate to non-bonding glass fiber.

16. The method of claim 15, wherein a molded sample formed from the composition exhibits a MAI rating energy at max force of greater than about 60 Joules when tested in accordance with ISO6603 standard, and wherein a molded sample of the composition achieves a V1 rating at a thickness of about 0.8 mm and a flame out time of less than about 60 seconds when tested in accordance with UL 94.

17. A composition comprising:

from about 70 wt. % to about 98 wt. % of a polycarbonate polymer component;

from about 0.01 to about 1 wt. % of a flame retardant additive, wherein the flame retardant additive is free or substantially free of bromine and/or chlorine;

from about 2 to about 20 wt. % of a non-bonding glass fiber; and from about 0.001 to about 5 wt. % of a stabilizer additive component, wherein the stabilizer additive component comprises butyl tosylate, wherein a molded sample formed from the composition exhibits a multi-axial impact (MAI) rating energy at max force of greater than about 60 Joules when tested in accordance with ISO6603 standard and wherein a molded sample of the composition achieves a V1 rating at a thickness of about 0.8 millimeter (mm) and a flame out time of less than about 60 seconds when tested in accordance with UL 94;

wherein at least one of the flame retardant additive comprises potassium perfluorobutanesulfonate or the composition further comprises a styrene encapsulated polytetrafluoroethylene in an amount from about 0.2 wt. % to about 1 wt. %;

wherein the weight percentages are based on the total weigh of the composition.

* * * * *